Patented Jan. 15, 1946

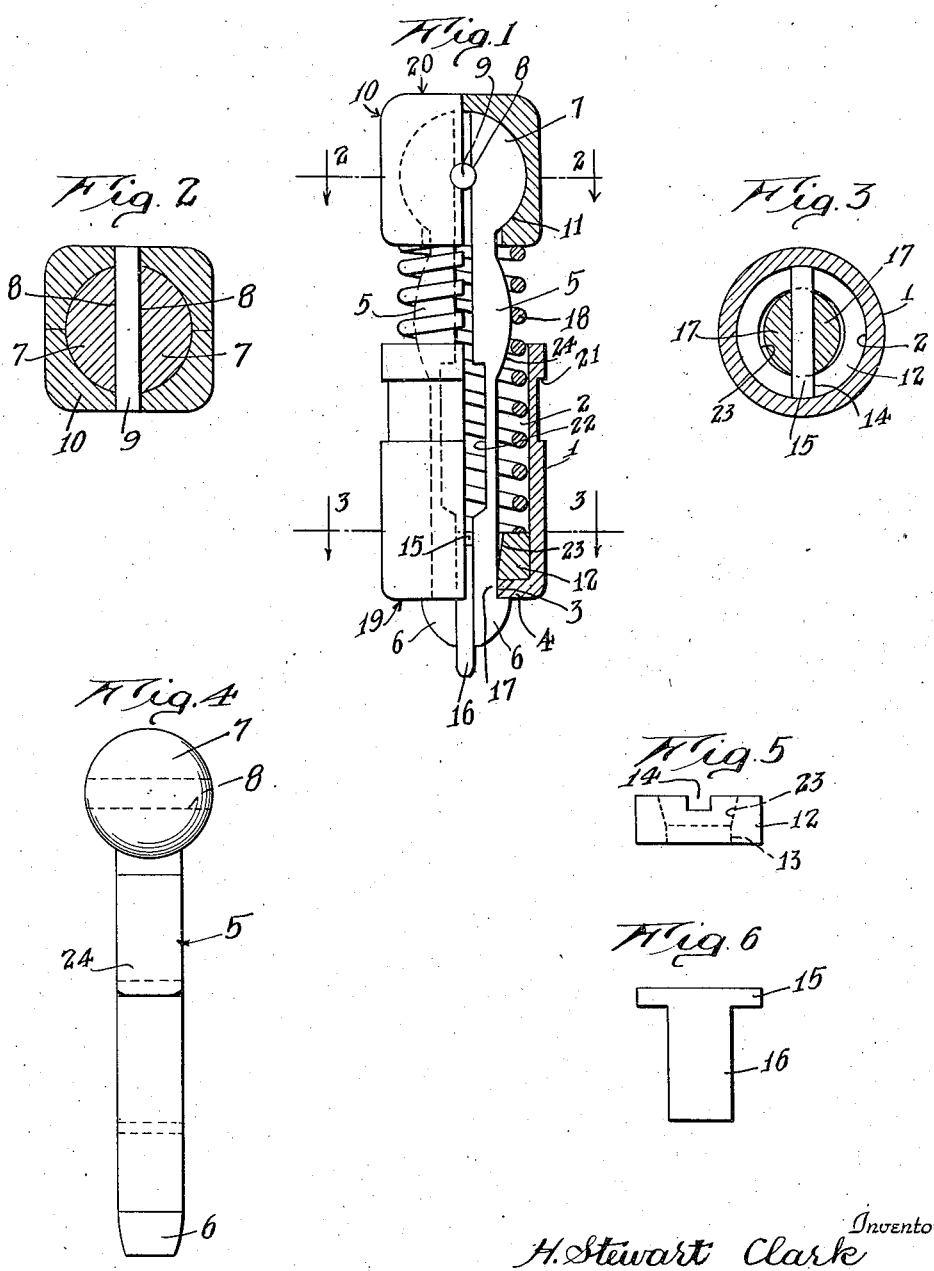

2,393,088

UNITED STATES PATENT OFFICE 2,393,088

FASTENER

Hiram Stewart Clark and Carlos S. Head, Los Angeles, Calif., assignors to F & H Manufacturing Company, a copartnership consisting of George H. Finkle and Ralph H. Head, Los Angeles, Calif.

Application November 2, 1942, Serial No. 464,190

8 Claims. (Cl. 85—5)

Our invention relates to fasteners, and more particularly to a fastener to be inserted in rivet holes for holding together two sheets of material and at the same time coaxially aligning said rivet holes.

Our present invention specifically is for use in heavy plate work in coaxially aligning the rivet holes and clamping together the sheets. In heavy plate work it is necessary that the fastener be entirely free from parts that rely upon their tensile strength for their action. Substantially all of the fasteners on the market rely on the natural spring of the parts to accomplish both the clamping and the aligning.

In our present invention we use complementary pins which are pivoted at one end and are spread at the other by a spreading T. When the fastener is actuated and extended from a body member for insertion in the rivet hole, the complementary pins are rotated and the ends extruding from the body go together.

An advantage of our invention is that the two complementary pins need never be bent, either for insertion or while in a clamping position, thereby preventing failure from fatigue in these parts.

Another advantage of our invention is that the tension spring which actuates the fastener does not lose part of its power in overcoming the natural spring of the pins as in the type of fasteners now used where the fasteners rely upon distortion of the pins to permit insertion in rivet holes.

Other objects and advantages of the invention will be apparent from the following description of the preferred embodiments.

In the drawings:

Fig. 1 is a view in partial cross-section;

Fig. 2 is a cross-section taken on line 2—2 of Fig. 1;

Fig. 3 is a cross-section taken on line 3—3 of Fig. 1;

Fig. 4 is a side view of a detail;

Fig. 5 is a side view of a detail;

Fig. 6 is a side view of a detail.

A fastener constructed in accordance with our invention comprises a body 1 having a central bore 2 and a hole 3 through the end 4. The hole 3 is substantially the diameter of the rivet holes into which the fastener is to be inserted. Through the hole 3 are passed the complementary pins 5 which have on one end the projections 6. The projections 6, when the pins are together, have a combined diameter substantially the diameter of the hole 3. At the other end of the pins 5 a half-ball section 7 is provided upon each pin and a groove 8 for the reception of a pivot pin 9 is provided in the inner surface of each ball section. A cap 10 comprising two complementary halves, forming on their interior a socket 11 for the reception of the ball sections 7, is placed over the ball sections 7 and held thereon by the pivot pin 9, either threaded to the cap halves 10 or inserted and peened over.

In the end of the bore 2 we provide a plug 12 through the center of which passes the bore 13 having similar diameter to that of the hole 3. A slot 14 is provided in the plug 12 for the reception of the head 15 of the T-shaped spreader 16. The width of the spreader 16 is such that the combined diameter of the necks 17 on the pins 5 is substantially that of the hole 3 and the spreader 16 will maintain the necks 17 against the sides of the hole 3. A tension spring 18 is placed around the complementary pins 5 with one edge bearing on the cap 10 and the other end upon the plug 12.

We prefer to construct the fastener with the spring 18 held under compression thus holding the projections 6 tight against the outer face 19 of the body 1.

To permit insertion of the fastener in a rivet hole pliers or a similar tool are placed against the outer surface 20 of the cap 10 and against the shoulder 21 on the body 1 and a compression thereby given to the spring 18, forcing the pins outwardly from the face 19. In fasteners now in use insertion through rivet holes is accomplished by merely forcing the projections 6 through the rivet holes causing the pins 5 to bend into a sufficiently small diameter to permit the insertion. In this action the pins 5 are distorted and are subject to breakage. To overcome this difficulty we provide the cavities or recesses 22 upon the inner surfaces of the pins 5. These cavities are of sufficient size to fit over and around the spreader 16 thus allowing the complementary pins 5 to be rotated upon their pivot 9. To force the pins 5 to rotate on the pivot 9, we provide a tapered surface 23 in the plug 12 which cooperates with the surfaces 24 upon the pins. When the fastener is actuated to force the pins 5 from the face 19, the spreader 16 enters the cavities 22 and at the same time the tapered surfaces 24 are squeezed toward each other by the tapered surfaces 23 causing the pins to rotate on the pivot 9. In this position the projections 6 of the pins 5 come together and the fastener can be inserted in a rivet hole.

Release of the compression upon the fastener causes the pins 5 to be retracted firmly clamping the material to be clamped between the projections 6 and the face 19 and at the same time the spreader 16 spreads the pins 5 into contact with the sides of the rivet holes and hold them in coaxial alignment.

While I have described the preferred embodiments of my invention, I am not limited to any of the details herein set forth except as specifically described in the following claims.

We claim:

1. In a fastener, a body, complementary pins slidably carried by said body, said pins being rotatably connected in respect to each other at one end, a spreader carried by said body to spread the other end of said pins, and means for causing said pins to rotate and for the last mentioned ends to be brought together when said fastener is actuated.

2. In a fastener, a body, complementary pins slidably carried by said body, said pins being rotatably conected in respect to each other at one end, the other end of said pins extending beyond a face of said body, and having projecting thereon a spreader carried by said body to spread the last mentioned ends of said pins when in clamping position, tension means for clamping material between said projections and said face, means for causing said pins to rotate to bring the projection ends on said pins together when said fastener is actuated.

3. In a fastener, a body, complementary pins slidably carried by said body, said pins being rotatably connected in respect to each other at one end, the other end of said pins extending beyond a face of said body, and having projecting thereon a spreader carried by said body to spread the last mentioned ends of said pins when in clamping position, tension means for clamping material between said projections and said face, and recesses carried by said pins into which said spreader fits when said fastener is actuated.

4. In a fastener, a body, complementary pins slidably carried by said body, said pins being rotatably connected at one end, the other end of said pins extending beyond a face of said body, and having projecting thereon a spreader carried by said body to spread the last mentioned ends of said pins when in clamping position, tension means for clamping material between said projections and said face, recesses carried by said pins into which said spreader fits when said fastener is actuated, and means cooperating with tapered surfaces on said pins to cause the free ends of said pins to be brought together.

5. In a fastener, a body, complementary pins slidably carried by said body, said pins being rotatably connected at one end, the other end of said pins extending beyond a face of said body, and having projecting thereon a spreader carried by said body to spread the last mentioned ends of said pins when in clamping position, tension means for clamping material between said projections and said face, recesses carried by said pins into which said spreader fits when said fastener is actuated, and a plug carried by said body, having a bore through which said pins are entered, and having a tapered surface that engages complementary surfaces on said pins to squeeze the end of said pins together when said fastener is actuated.

6. In a fastener, a body, complementary pins slidably carried by said body, said pins being rotatably connected at one end, a spreader carried by said body to spread the other end of said pins, and recesses carried by said pins into which said spreader fits when said fastener is actuated.

7. In a fastener, a body, complementary pins slidably carried by said body, said pins being rotatably connected at one end, a spreader carried by said body to spread the other end of said pins, recesses carried by said pins into which said spreader fits when said fastener is actuated, and means cooperating with tapered surfaces on said pins to cause the free ends of said pins to be brought together.

8. In a fastener, a body, complementary pins slidably carried by said body, said pins being rotatably connected at one end, a spreader carried by said body to spread the other end of said pins, recesses carried by said pins into which said spreader fits when said fastener is actuated, and a plug carried by said body having a bore through which said pins extend, and having a tapered surface that engages complementary surfaces on said pins to squeeze the end of said pins together when said fastener is actuated.

H. STEWART CLARK.
CARLOS S. HEAD.